W. W. BATES.
WHIFFLETREE ATTACHMENT.
APPLICATION FILED JAN. 14, 1911.

1,000,981.

Patented Aug. 22, 1911.

W. W. Bates,
Inventor

Witnesses by C. A. Snow & Co.
Attorneys

UNITED STATES PATENT OFFICE.

WILLIAM W. BATES, OF LINDALE, TEXAS.

WHIFFLETREE ATTACHMENT.

1,000,981.

Specification of Letters Patent.   Patented Aug. 22, 1911.

Application filed January 14, 1911.   Serial No. 602,645.

*To all whom it may concern:*

Be it known that I, WILLIAM W. BATES, a citizen of the United States, residing at Lindale, in the county of Smith and State of Texas, have invented a new and useful Whiffletree Attachment, of which the following is a specification.

It is the object of the present invention to provide an improved device for attaching swingle trees to double trees or for attaching swingle or double trees to the cross bars between the shafts of a vehicle and the invention aims primarily to provide a supporting or attaching device for a swingle or whiffle tree which will absorb any sudden jerks upon the draft appliances as a whole and will consequently prevent such jerks being transmitted to the body of the vehicle.

One object of the invention is to so construct the device as to obviate the employment of heavy helical springs as the cushioning means it being only necessary to employ a comparatively light and small spring of this class.

Figure 1:
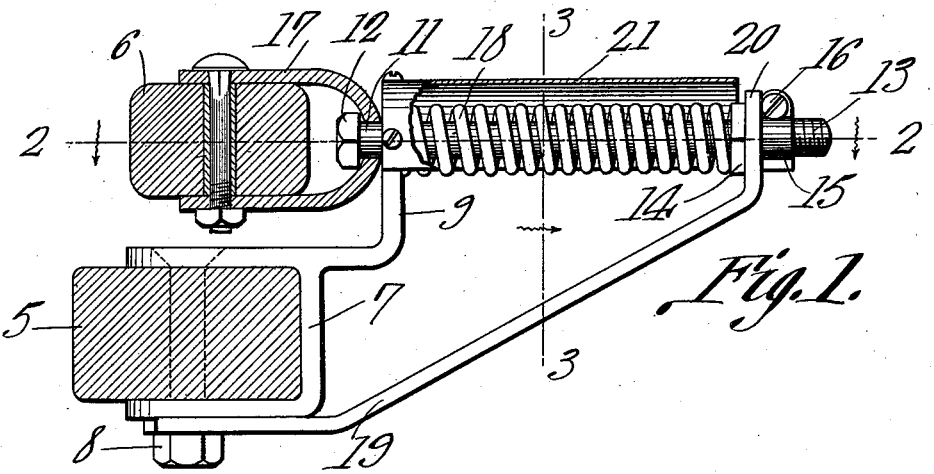
Figure 2:
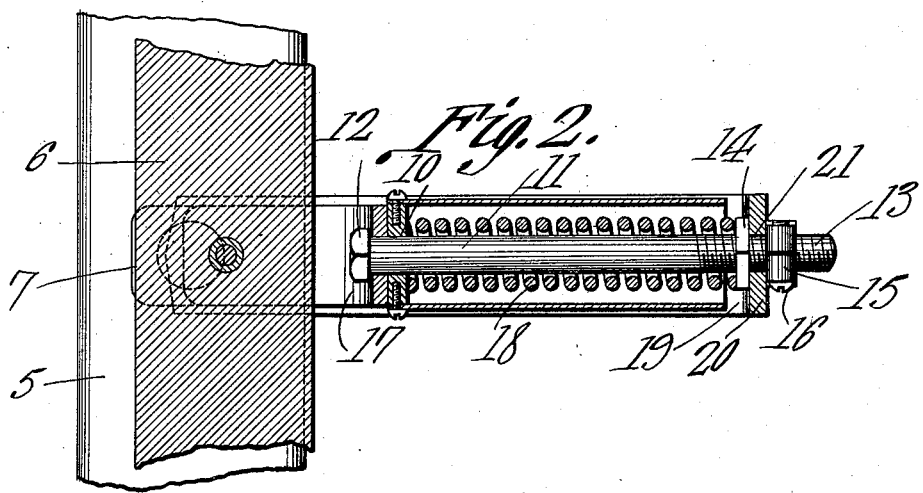
Figure 3:
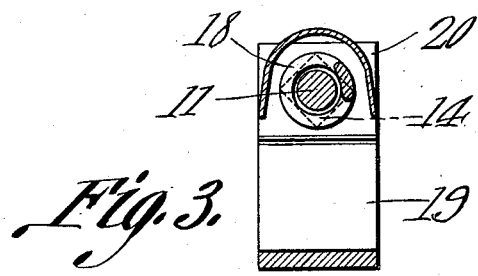

In the accompanying drawings—Figure 1 is a side elevation of the device embodying the present invention, several parts being shown in section. Fig. 2 is a horizontal sectional view on the line 2—2 of Fig. 1. Fig. 3 is a transverse sectional view on the line 3—3 of Fig. 1.

In the drawings, the numeral 5 indicates the cross bar between the shafts of a buggy or similar vehicle (although this element may be a double tree or a portion of a vehicle tongue) and 6 designates a swingle tree which is supported upon the cross bar 5 by the device embodying the present invention.

The supporting device includes, in its structure, a bracket having an attaching portion 7 which is bolted as at 8 to the cross bar 5. This bracket also includes a rearwardly offset portion 9 which is formed, near its upper end, with an opening 10. Slidably engaged through this opening is a bolt 11 provided at its forward end with a head 12, and threaded at its rear end as at 13. A nut 14 is threaded upon the bolt at its rear end and a split nut 15 is also threaded thereon and is closed and clamped upon the bolt by means of a set screw 16. Swiveled to the forward end of the bolt 11 is a clip 17 in which is pivoted the swingle tree 6.

Disposed upon the bolt 11 is a spring 18 which bears at its forward end against the upstanding or offset portion 9 of the bracket and at its rear end against the nut 14, the tendency of this spring being to draw the bolt 11 rearwardly although it will be readily understood that when a pull is exerted upon the swingle tree 6, the spring will be compressed and the bolt will slide forwardly through the opening 10 in the portion 9 of the bracket of the device.

To properly resist a sudden forward pull upon the swingle tree 6 would require that the spring 18 be comparatively heavy and strong and in order to obviate the employment of such a spring, there is provided a secondary spring which will now be described. A resilient leaf spring 19 is secured at its forward end to the under side of the attaching portion of the bracket 7 through the medium of the bolt 8 which secures this portion of the bracket to the double tree and said leaf spring projects rearwardly from its above described point of attachment and at its rear end is bent up as at 20 and formed in its bent up portion with an opening 21 through which passes the threaded rear end portion of the bolt 11, the nuts 14 15 clamping the portion 20 of the leaf spring between them and thus connecting its rear end with the bolt. It will now be understood that the resiliency of the spring 19 is combined with that of the spring 18 to yieldingly resist the forward sliding movement of the bolt 11 through the opening 10 and inasmuch as the spring 19 can, by reason of its peculiar form, be of maximum strength, without however being exceptionally heavy, the device is not rendered bulky nor unattractive.

To protect the spring 18 and also the bolt and render the device more attractive in appearance, an open sleeve 21 is secured at its forward end to the upstanding end of the portion 9 of the bracket of the device and projects rearwardly with its rear end located adjacent the portion 20 of the leaf spring 19 but free from attachment thereto for obvious reasons.

What is claimed is:

A device of the character described, including a bracket having a fixed point of attachment, a whiffletree, a bolt-member, means intermediate of said whiffletree and said bolt, adapted to allow of independent movement, in said intermediate means, of said bolt, a resilient member delivering its pressure upon said bolt, and a supplemental resilient member also having, in common with said bracket, a fixed point of attachment at one end, the opposite end of supplemental resilient member having fixed connection with said bolt, near one end thereof, said supplemental resilient member having its point of connection with said bolt at right-angles to its fixed point of attachment.

In testimony that I claim the foregoing as my own, I have hereto affixed my signature in the presence of two witnesses.

WILLIAM W. BATES.

Witnesses:
 HOLT LIMERICK,
 C. E. OWEN.

Copies of this patent may be obtained for five cents each, by addressing the "Commissioner of Patents, Washington, D. C."